Sept. 1, 1925.
L. P. HALLADAY
AUTOMOBILE SPRING SUSPENSION
Filed Dec. 20, 1923
1,552,148
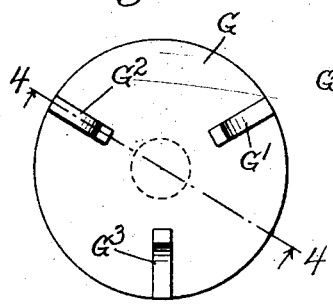
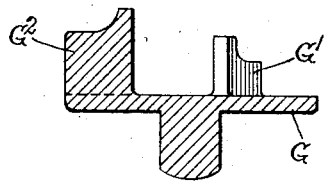
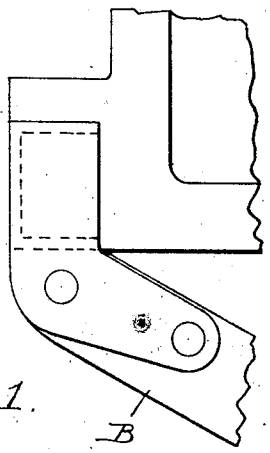
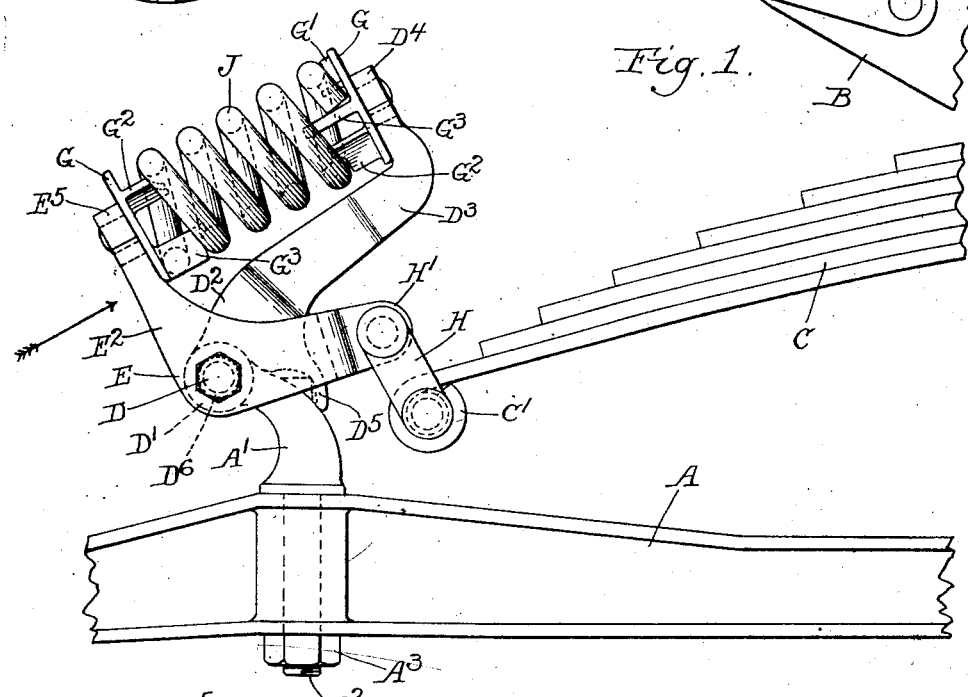
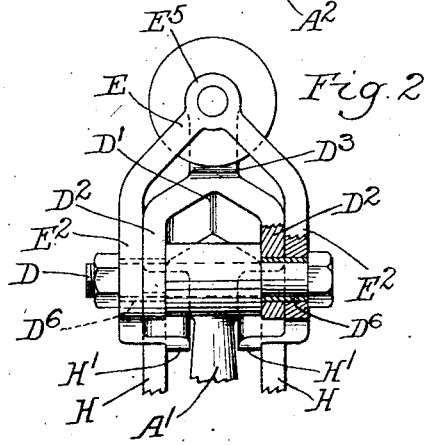
Inventor.
Lewis P. Halladay.
by Parker & Carter
Attorneys.

Patented Sept. 1, 1925.

1,552,148

UNITED STATES PATENT OFFICE.

LEWIS P. HALLADAY, OF DECATUR, ILLINOIS.

AUTOMOBILE SPRING SUSPENSION.

Application filed December 20, 1923. Serial No. 681,733.

*To all whom it may concern:*

Be it known that I, LEWIS P. HALLADAY, a citizen of the United States, residing at Decatur, in the county of Macon and State of Illinois, have invented a certain new and useful Improvement in Automobile Spring Suspensions, of which the following is a specification.

My invention relates to an improvement in shock absorbers and particularly to an improvement in a spiral spring shock absorber which is simple to manufacture and easy to assemble. Various other objects will appear from time to time in the course of the specification and claims.

I illustrate my invention more or less diagrammatically in the accompanying drawings wherein—

Figure 1 is a side elevation of the shock absorber in position;

Figure 2 is a view along the axis of the supplemental spring in the direction of the arrow in Figure 1;

Figure 3 is a detail; and

Figure 4 is a section on the line 4—4 of Figure 3.

Like parts are illustrated by like characters throughout the drawings and specification.

A is a vehicle axle upon which is mounted the spring perch $A^1$ secured thereto by the bolt $A^2$ and the nut $A^3$. It will be noted that in Figure 1 the spring perch is rotated to a position opposite to that in which it is used when the supplemental spring support is dispensed with.

B is any suitable vehicle frame member which is mounted for example on the semi-elliptic spring C.

Pivoted on a bolt or pin D passing through the eyelet of the perch $A^1$ is a supplemental spring supporting element $D^1$ forked as at $D^2$, $D^2$ and having a stem inclined upwardly and inwardly from the spring perch as at $D^3$, terminating in a bracket or bend $D^4$. Although this element is rotatable about the pin D it is normally held in the position shown in Figure 1, the lug $D^5$ being adapted to contact the inclined stem of the perch $A^1$. In normal operation therefore, this element is fixed and serves as a fixed support for one end of the supplemental spring later to be described.

E is a second spring support, pivoted as at $D^1$ upon the pin D, its arms $E^2$, $E^2$ being positioned thereupon outside of the arms $D^2$, $D^2$ of the fixed support. The support E forms virtually a bell crank lever, as shown in Figure 1, and terminates in the moving spring support $E^5$.

Secured to the bracket end $D^4$ of the fixed support and to the end $E^5$ of the moving support are spring contacting plates G, each provided with three peripheral radial lugs of varying height, $G^1$, $G^2$ and $G^3$. Each lug is substantially higher at its inner than at its outer end. The inner end or bell crank lever of the moving support E is connected to the spring C through the link H which is pivoted at one end in the eyelet $C^1$ of the spring and to the other in the eyelet $H^1$ of the bell crank lever.

J is a spiral spring adapted to be compressed between the opposed plates G. The angular relation of the radial lugs on the plates and the spring is such that the end of the spring abuts against the highest of the three lugs, and is successively contacted by or supported by the lowest lug $G^1$, the intermediate lug $G^2$ and finally the top of the highest lug $G^3$. The spring is centered upon these lugs by the shaping of the lugs, the lugs being adapted to conform to the circular cross section of the spring wire, and being herein shown as shaped higher at their inner than at their outer ends to have the effect of a core projecting upwardly into the spring and centering it.

For ease in assembling the elements $D^2$ and $E^2$ are pivoted together on two separate sleeves, $D^6$, $D^6$. The sleeve may be rotatable on each or rigid on the one and rotatable in the other as the case may be and the holding pin D is passing through these two sleeves and through the perch $A^1$. The result of this is that the spring J may be assembled under compression in the factory and will cause the part $H^1$ to engage the part $D^3$ until weight is applied by the vehicle spring. If these sleeves are not used, then in order to assemble the apparatus on a car it is necessary to provide some kind of holding tool which will compress the spring J so as to permit the operator to fit the parts $D^2$, $E^2$ together and line them up with the pin or bolt D. This is possible but the preferred form as above outlined saves the necessity of compressing the spring J separately.

It will be realized that while I have shown an operative device, many changes might be made in the size, shape, number, proportion, relation and disposition of parts without departing from the spirit of my invention, and I, therefore, wish my description and drawings to be taken as in a large sense diagrammatic.

The use and operation of my invention are as follows:

The shock absorber is assembled with the bell crank lever or moving spring support and the normally fixed spring support both pivoted on the pin D on the perch A¹. Compressed between the plates G is the spiral spring J, each end of it abutting against the highest of the three lugs upon the adjacent plate, and supported also by the tops of the three lugs, and centered on the plate by the upward projection of the inner end of each of the three lugs. The use of these plates and lugs thus makes unnecessary any flattening or shaping of the end of the spring, and makes unnecessary any additional guiding or centering element or mechanism for the spring. The result is a shock absorber of extreme simplicity of manufacture and assembly and the individual supplemental springs used need simply be clipped to the desired length from the spring stock used. The entire supplemental spring action intervenes between the leaf spring and the spring perch. In the form of automobile herein illustrated the spring perch A¹ would normally be turned in the opposite direction and would receive the end of the leaf spring C. No structural modification is needed to mount my supplemental shock absorber mechanism upon the vehicle beyond turning the spring perch A¹. The fixed spring support D³ is held in position by the pressure of the spring which presses the lug D⁵ down against the side of the perch, the bell crank lever or moving support rotating about a pin D through the eyelet of the spring perch and to which the leaf spring is secured.

I claim:

1. In a vehicle, a running gear, and a body, a leaf spring between the body and the running gear, and a supplemental yielding support between the body and the running gear comprising a fixed element, a pivoted element, a spiral spring interposed and compressed between them, and a pivot connection between the pivoted element and leaf spring, and spring engaging elements upon said fixed and said pivoted elements, comprising each a plate with a plurality of peripheral upwardly projecting spring supporting lugs positioned thereabout, said lugs being graduated as to size.

2. In a vehicle, a running gear, and a body, a leaf spring between the body and the running gear, and a supplemental yielding support between the body and the running gear comprising a fixed element, a pivoted element, a spiral spring interposed and compressed between them, and a pivot connection between the pivoted element and leaf spring, and spring engaging elements upon said fixed and said pivoted elements, comprising each a plate with a plurality of peripheral upwardly projecting spring supporting lugs positioned thereabout, said lugs being graduated as to size to conform substantially to the pitch of the spring end.

3. In a vehicle, a running gear, and a body, a leaf spring between the body and the running gear, and a supplemental yielding support between the body and the running gear comprising a fixed element, a pivoted element, a spiral spring interposed and compressed between them, and a pivot connection between the pivoted element and leaf spring, and spring engaging elements upon said fixed and said pivoted elements, comprising each a plate with a plurality of peripheral projections thereabout, said projections being graduated as to size to conform substantially to the pitch of the spring end, one of said lugs being adapted to serve as an abutment for the end of the spring to prevent rotation of the spring in response to its compression.

Signed at Chicago, county of Cook and State of Illinois, this 13th day of December 1923.

LEWIS P. HALLADAY.